United States Patent [19]

Ricard

[11] Patent Number: 5,208,977
[45] Date of Patent: May 11, 1993

[54] PROCESS FOR THE CONNECTION OF CONDUCTOR WIRE OR OPTICAL FIBER SECTION ENDS TO CONNECTORS

[76] Inventor: Claude Ricard, Villa Ste Magdeleine 52 Cours GAMBETTA, 13100 Aix En Provence, France

[21] Appl. No.: 777,697

[22] Filed: Oct. 17, 1991

[30] Foreign Application Priority Data

Oct. 17, 1990 [FR] France .................. 90 13137
Oct. 17, 1990 [FR] France .................. 90 13138
Oct. 17, 1990 [FR] France .................. 90 13139

[51] Int. Cl.$^5$ .................................. A01R 43/04
[52] U.S. Cl. ............................. 29/861; 29/857; 29/33 F; 29/33 M
[58] Field of Search ............. 29/748, 857, 861, 33 F, 29/33 M

[56] References Cited

U.S. PATENT DOCUMENTS

| | | | |
|---|---|---|---|
| 4,428,114 | 1/1984 | Teagno | 29/748 X |
| 4,581,796 | 4/1986 | Fukuda et al. | 29/748 X |
| 4,835,858 | 6/1989 | Adlon et al. | 29/748 X |
| 5,083,369 | 1/1992 | Cerda | 29/857 |

Primary Examiner—Carl J. Arbes
Attorney, Agent, or Firm—Browdy and Neimark

[57] ABSTRACT

The object of this invention is processes and devices for the automatic connection of conductor wire or optical fiber section ends to adapted component receptacles using clamps of various types and having specific uses.

A device according to the invention comprises a conveyor (1) which feeds clamps to various end processing units. Loading unit (5) positions wire sections in a first type of clamp (2). Units (4), (20) modify the ends for purposes of their connection. Unit (21) interchanges the ends in clamps to arrange them in a preferential order for the connection which is subsequently performed by one or more units (32). The invention uses clamps adapted to a variety of operations, to hold a group of wires (72) or to hold components (34).

An application is the automatic production of conductor wire bundles.

14 Claims, 10 Drawing Sheets

PROCESS FOR THE CONNECTION OF CONDUCTOR WIRE OR OPTICAL FIBER SECTION ENDS TO CONNECTORS

The object of this invention is processes and devices for the automatic connection of conductor wire or optical fiber ends to adapted component receptacles.

The invention is in the technical sector of automatic wiring machine construction.

Patent Application FR 86 16777/2,607,652 filed on Nov. 28, 1986 describes processes for automatically inserting connectors crimped on the ends from a lot of conductor wires coming out of an automatic wiring machine into the sockets of insulating housings or conductive terminals.

French Patent Application FR 87 11391 / 2,619,258 filed on Aug. 17, 1987 and U.S. Pat. No. 4,715,099 (YOSHIDA) of Dec. 29, 1987 describe wiring machines wherein several conductor wires are transported by clamps which are placed on a conveyor incorporated into an automatic wiring machine, said clamps each holding one end of a wire section. FR-A-2619258 also describes the making of conveyors and clamps.

French Patent FR-A-2,555,397 describes another type of automatic machine and a connection device for simple bundles shown in FIGS. 7-11.

The above-cited patents define wiring machines wherein:
- A conveyor endowed with clamps to grasp and hold conductor wire ends is transferred by intermittence;
- Said ends are grasped, held, and transferred by intermittence along a given transfer path using said clamps of said conveyor;
- Said clamps are used to feed some of said ends to end processing units arranged laterally along said transfer path: loading unit, stripping unit, crimping unit, etc.;
- If applicable, said ends are modified using said end processing units.

Said machines are controlled by a programmable central computer. They automatically cut sections of wires whose length is determined by the program. They strip some of said section ends and automatically perform crimping operations.

These patents do not teach how to make wiring machines capable of constructing complex bundles comprising a wide range of different connectors.

The automatic mutual insertion of two rigid mechanical parts, male and female, is known in the field of mechanical parts assembly. However, where wiring machines are concerned, these operations are different and become complex when not involving two rigid mechanical parts, but instead a set of flexible wires to be connected in a limited area.

Connecting the first wire is a delicate operation owing to the small clearances involved, but this operation is performed in a perfectly known context.

However, when the first wire is connectorized, it becomes an obstacle to the automatic connection of the subsequent ones, and the encumbrance increases for the connection of the subsequent wires because of the entanglement of the wires which have already been connectorized.

This results in numerous collisions of the ends, which interrupts operations owing to ends which strike against wires which have already been inserted, which jams the automatic machine and makes it less productive.

Furthermore, the wire ends are generally endowed with connectors which are usually crimped, and said connectors become damaged in collisions with wires which have already been inserted, leading to a lower quality level.

This makes known automatic machines unreliable and limits their use to particular bundles in which no collisions occur: parallel bundles or very simple bundles which use connectors having only one layer of contacts, such as in French Patent FR-A-2,555,397. Said particular bundles only represent a minority, and the other bundles, known as complex bundles, are not processed automatically.

The solution to this problem which has been proposed in the prior art cited above is not effective for bundles comprising a great variety of connectors, which is generally true for complex automobile bundles.

Processes or devices for performing some necessary operations such as interchanging wires or arranging a set of ends in a given order, for example, must also be invented or improved.

One object of this invention is the construction of automatic wiring machines which perform the automatic connection of conductor wire or optical fiber section ends to connectors, whose productivity and quality levels are not reduced by the collisions of ends against wires which have already been connected.

Another object of this invention is to to build automatic wiring machines as described above which can process complex bundles.

Another object of the invention is to enable the automatic connection of ends endowed with the widest variety of connectors.

The process according to the invention provides
- A conveyor endowed with clamps to grasp and hold said ends;
- Said ends are grasped, held, and intermittedly transferred along a given transfer path using said clamps of said conveyor;
- If applicable, said clamps are used to feed some of said ends to end processing units arranged laterally along said transfer path;
- If applicable, said ends are modified using said end processing units. The objects of the invention are reached using a process wherein clamps of various types and having specific uses are placed on said conveyor.

Advantageously, some of said clamps make it possible to grasp and hold several wires in a given order and in a limited space.

Advantageously, said clamps can be separated from said conveyor and can be engaged mechanically thereon or withdrawn mechanically therefrom.

Also, according to a preferred process:
- Said ends are fed to an interchange unit which is placed laterally along said transfer path, and the order of some of said ends on said conveyor is modified using said interchange unit;
- Said clamps are used to feed several of said ends to at least one connection unit placed laterally along said transfer path downstream from said interchange unit, and which comprises means to take a given end and connect it to one of said connectors of the component or components clamps which it is processing;

And, using said connection unit, some of said ends are taken in said clamps on said conveyor, and are connected to some of said connectors in a predetermined manner, taking them in an order which can be different from the order in which said ends are fed to said connection unit.

Advantageously, some of said clamps make it possible to grasp and hold several wires in a given order and in a limited space.

Advantageously, in a process according to the invention to produce bundles, all of the components of the same branch of a bundle are grouped together on one or more component clamps.

Other specific objects in making the interchange unit, which is a subunit of this complex invention, are reached using a process according to which some wires are transferred temporarily to a standby position so that they can be subsequently taken up and arranged in a predetermined order.

Advantageously, said clamps can be separated from said conveyor and can be engaged mechanically thereon or withdrawn mechanically therefrom.

Advantageously, to make wiring bundles and to enable the automatic interconnection of several connectors of different electrical components with conductor wire or optical fiber sections, several connection units are arranged laterally along said transfer path.

The object of the invention is reached using clamps of various types and having specific uses intended for the automatic connection of conductor wire or optical fiber section ends to connectors, which can be transported by the same conveyor, separated from said conveyor, and which can be mechanically engaged thereon or withdrawn therefrom, wherein they comprise all of the same means to interface with said conveyor and have an automatically-legible inscription making it possible to identify the type.

A result of this invention is the construction of wiring machines, primarily an automatic wiring machine, enabling the automatic connection of conductor wire or optical fiber section ends with the connect of an electrical component, which are in disarray, and, in this way, making it possible to process most bundles.

Said first result enables the automatic assembly of bundles or interconnections and makes it possible to avoid most operating interruptions owing to ends which strike against wires which have already been inserted. Said first result also enables the automatic assembly of bundles or interconnections while avoiding the deterioration in quality of a final product caused by damage to connectors during automatic connection resulting from the collisions of said connectors on already-inserted wires.

Another result of the invention is that it enables the automatic connection of ends endowed with widest variety of connectors.

The interchange unit has two gripping components, thus providing a temporary storage unit, and, in this way, two ends are moved in one round trip movement, which takes less time than two consecutive movements.

This invention also makes the following possible:

Making bundles which require the simultaneous connection of more components than one component clamp can hold;

Organizing the groups of wires connected to the components of the same component clamp more effectively, preventing any untimely knotting or crossing of the wires from different branches, and grouping all of the components in the same branch of a bundle on one or more component clamps.

Limiting the number of housings which must be fed simultaneously on one or more connection units, because this makes it possible to connect different housings successively, thus reducing the required number of connection units and the number of components on the same component clamp, thereby reducing the cost of the wiring machine and increasing its flexibility.

Manufacturing more complex bundles and automating numerous manual tasks, while improving productivity and quality.

The description below makes reference to the accompanying drawings, which,, on a purely non-restrictive basis, show a sample embodiment of a device according to the invention and various types of clamps designed to equip it.

Figure 4:
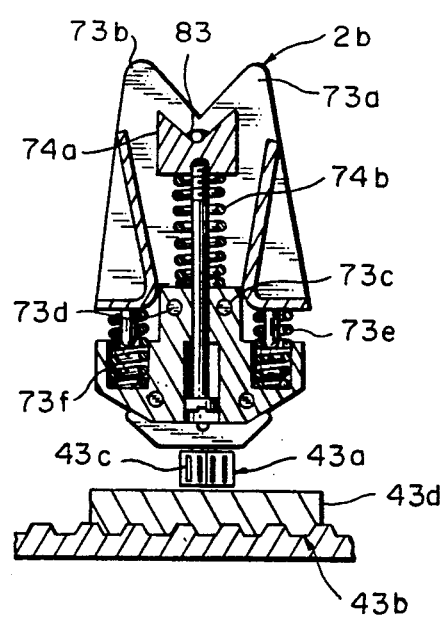
Figure 5:
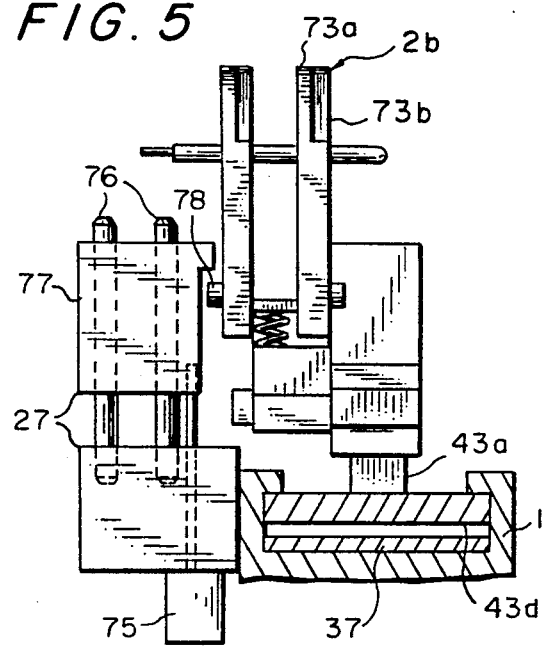
Figure 6:
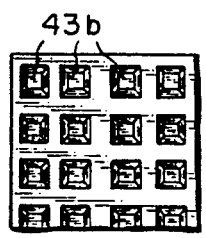

FIGS. 4, 5, and 6 are respectively, a transverse section of an end clamp, an elevation view of said clamp and the accompanying opening device, and bottom view of the base of said clamp.

Figure 7:
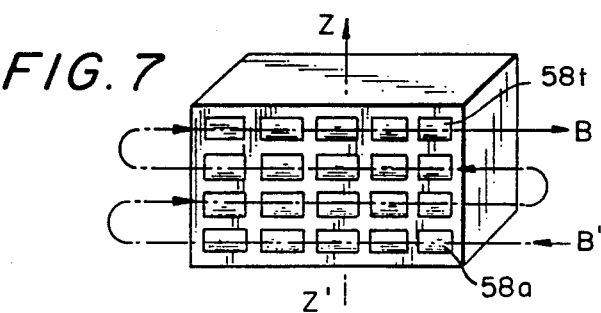

FIG. 7 illustrates a preferred insertion order.

Figure 8:
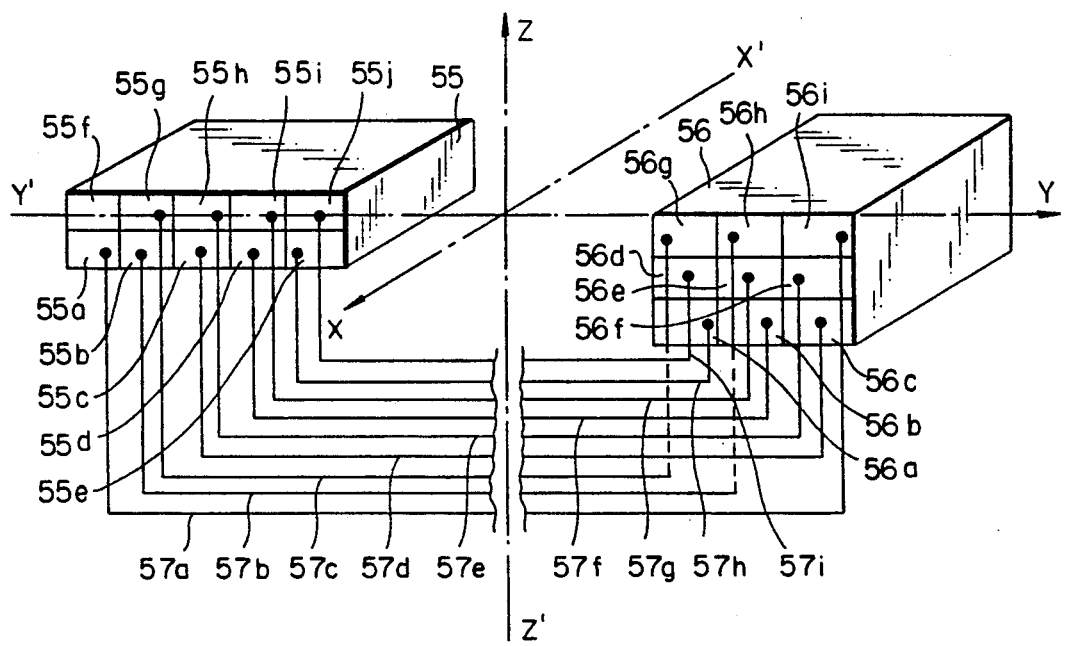

FIG. 8 shows a bundle for which the production process is determined as an example.

Figure 9:
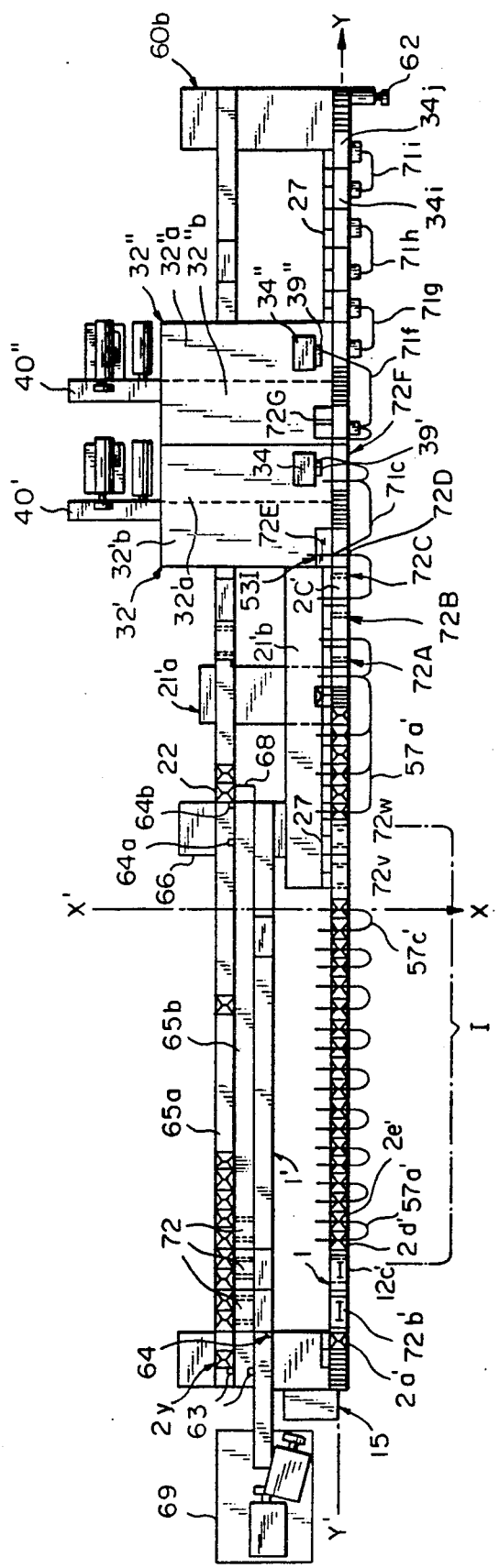
Figure 10:
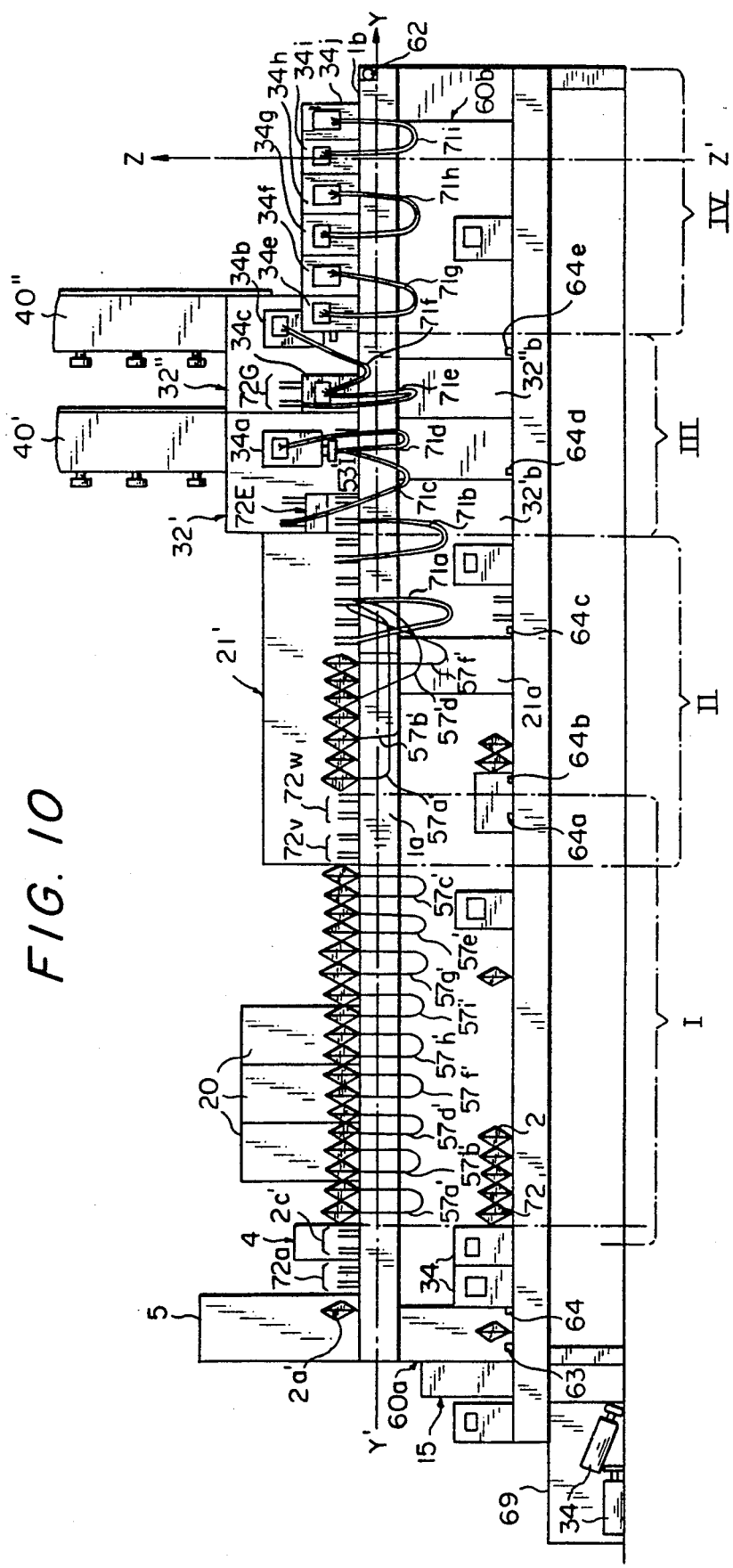

FIGS. 9 and 10 are respectively, a top view and an elevation view of a device according to the invention in the process of manufacturing a bundle.

Figure 11:
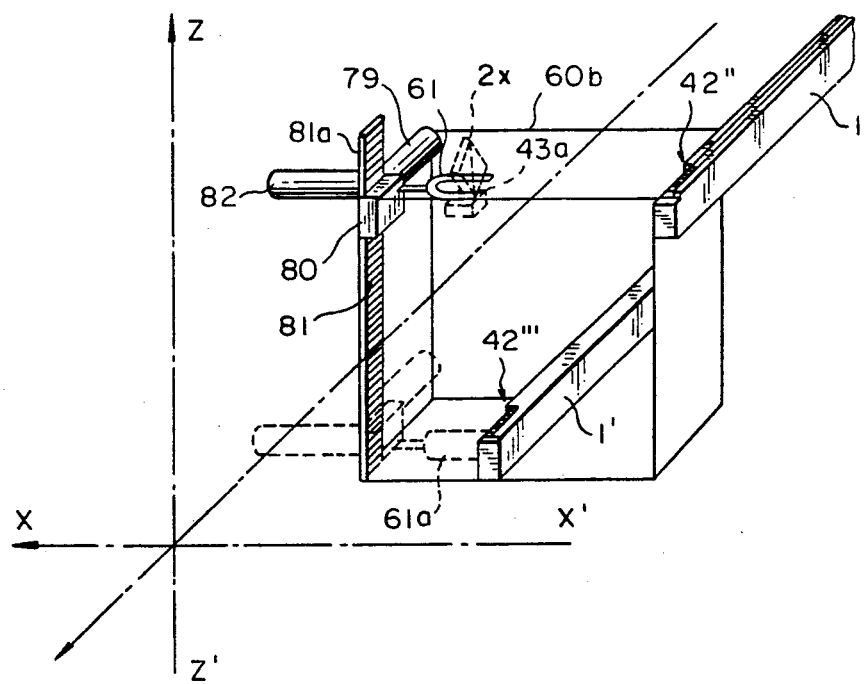

FIG. 11 is a perspective view of an embodiment of a loading system.

Figure 12:
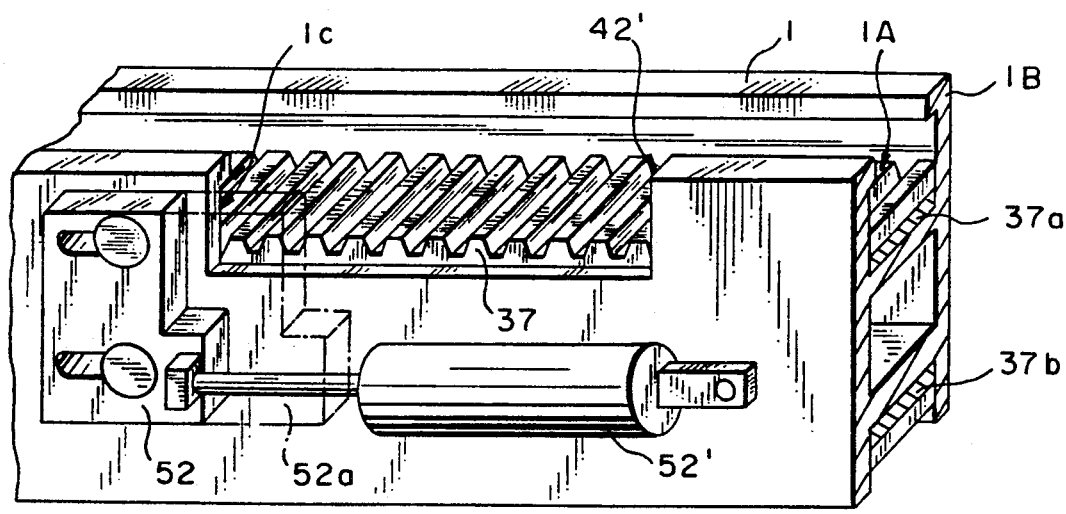

FIG. 12 is a view of the locking system associated with a cut-out in the conveyor.

Figure 13:
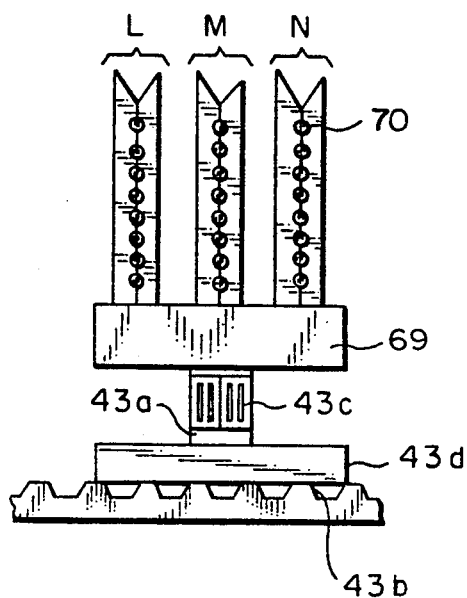
Figure 14:
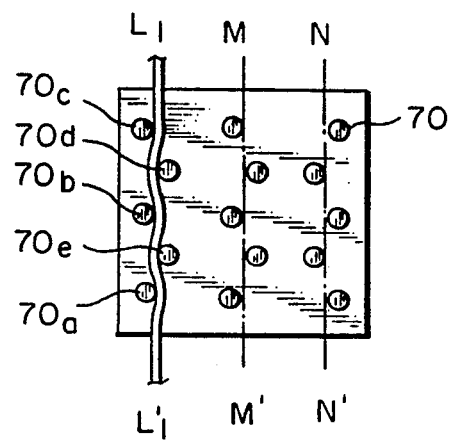

FIGS. 13 and 14 are an elevation view and a top view of one of the group clamps.

Figure 15:
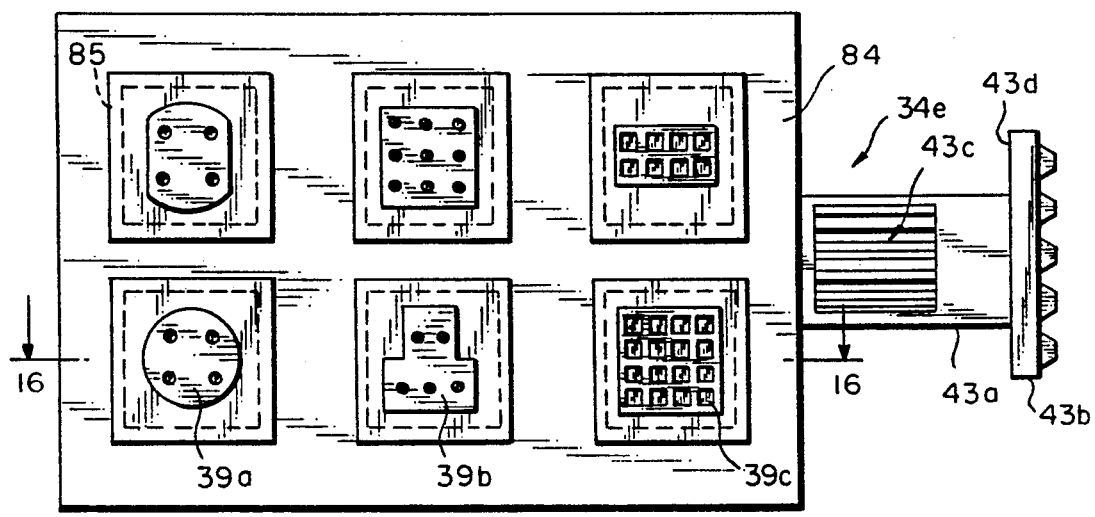
Figure 16:
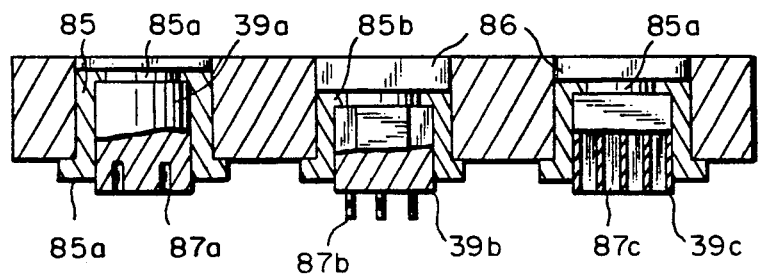

FIGS. 15 and 16 show a front view and a transverse section of an embodiment of a component clamp according to the invention.

Figure 17:
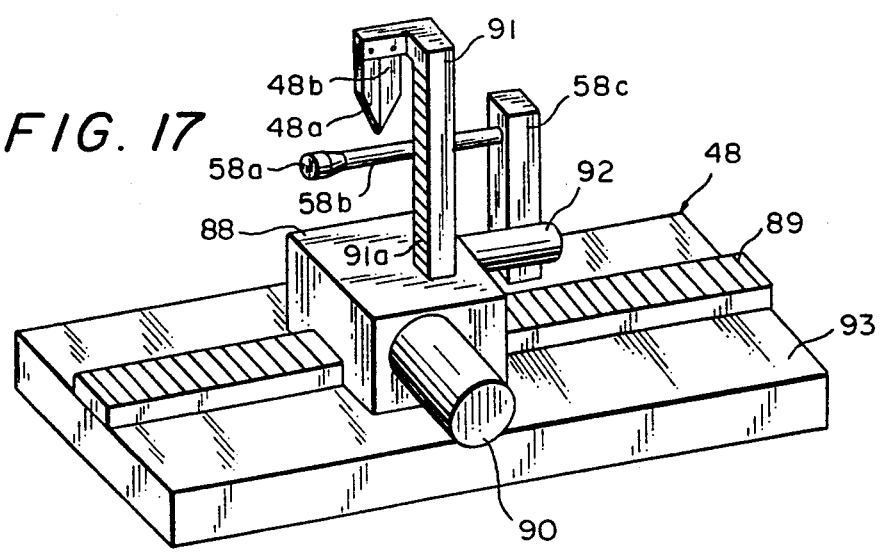

FIG. 17 is a perspective view of an embodiment of the connection manipulator from one perspective.

Figure 18:
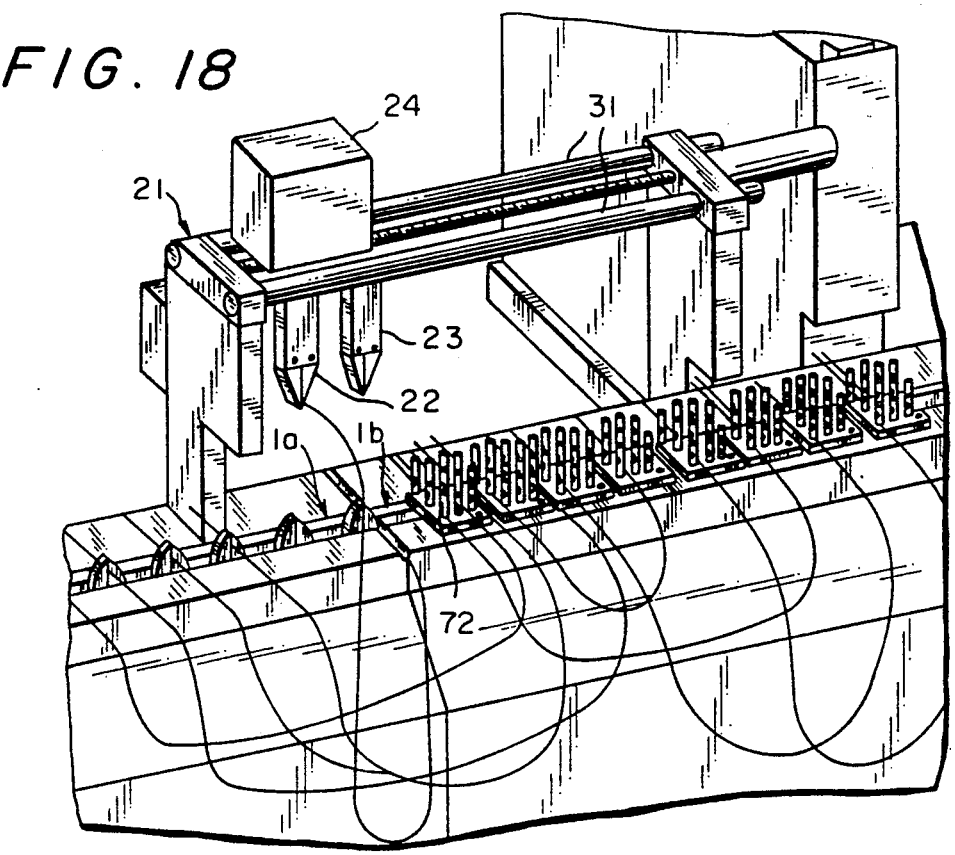
Figure 19:
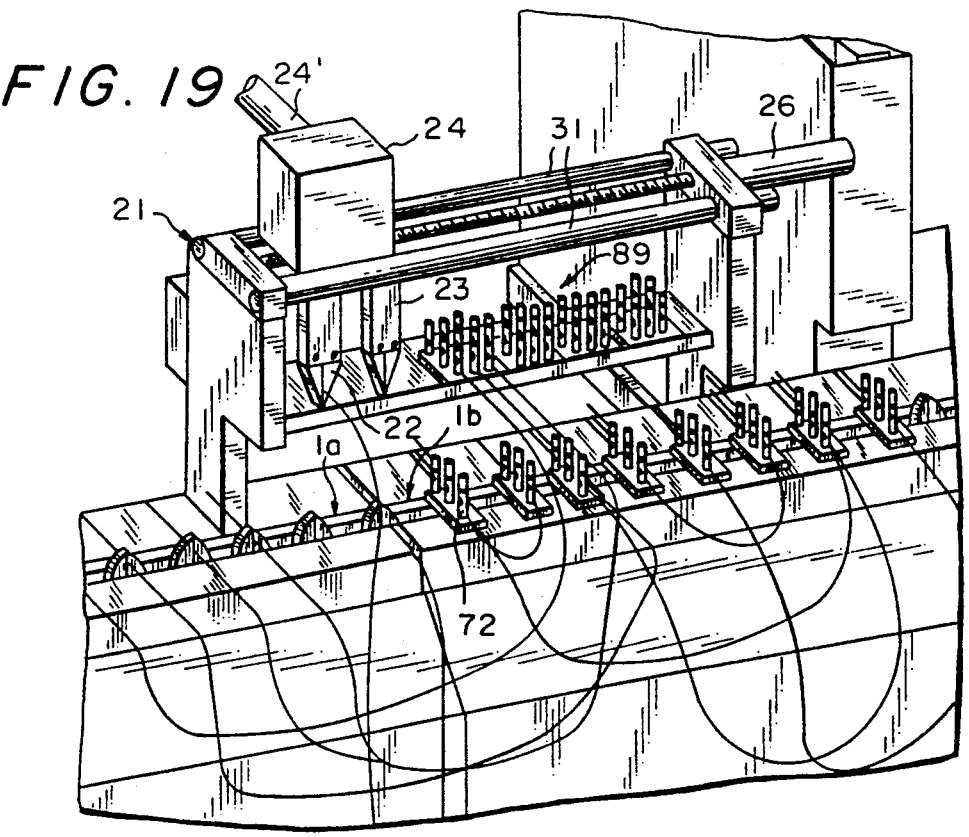

FIGS. 18 and 19 are a partial perspective view of the interchange unit.

Figure 1:
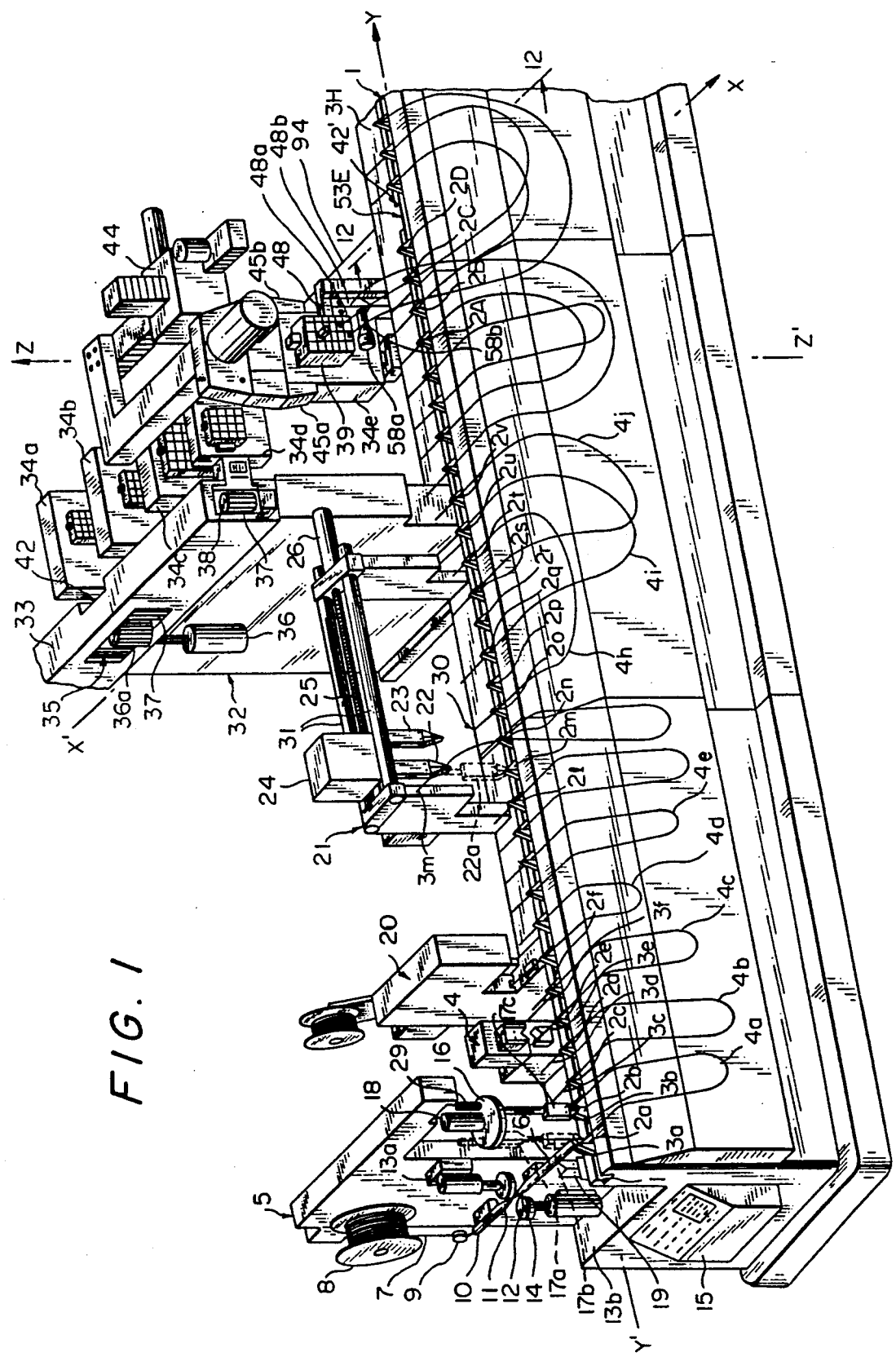
FIG. 1 is a partial perspective view of a device according to the invention.

FIG. 1 shows that conveyor (1) is endowed with clamps (2a), (2b), (2c), (2d), etc. to grasp and hold the ends such as (3a), (3b), (3c), etc. of wire sections such as (4a), (4b), (4c), etc. A wire section can be an electrical conductor as well as an optical fiber.

Said clamps, which make it possible to transport said ends along a given transfer path, are advantageously placed at regular intervals on the conveyor.

The computer (15) has positioned a variety of clamps (2a) and (2b) on conveyor (1) using the loading device, as shown in FIG. 1.

FIG. 1 shows that some clamp locations such as (53E) remain vacant and that some clamps such as (2p) do not hold wire ends. Some empty clamps are advantageously intended to be used to grasp ends transferred by interchange unit (21) from other clamps and some locations are left empty for the later placement of special clamps of a type other than is used to grasp and hold wire ends, such as shown in FIG. 15 and 16.

Conveyor is moved intermittently in equal steps, which generally represent the interval between two clamps, and in this case, end (3e) fed by clamp (2e) to end processing unit (4) is replaced by subsequent end (3d). In this way, stripping unit (4) can strip two consecutive ends. The conveyor (1) thus transfers all of the clamps it holds in the downstream direction.

The transfer is made intermittently in order to allow the different units to perform predetermined and specific actions under the control of computer (15) on the ends fed to them by conveyor (1) which is also under the control of the computer (15), such as placing the ends of wire sections having predetermined lengths in clamps for loading unit (5), such as modifying the ends for stripping unit (4) or crimping unit (20), such as changing the order of some of said ends on said conveyor by interchange unit (21), and such as the connection of components to some receptacles in a predetermined manner for a connection unit such as (32).

Figure 1A:
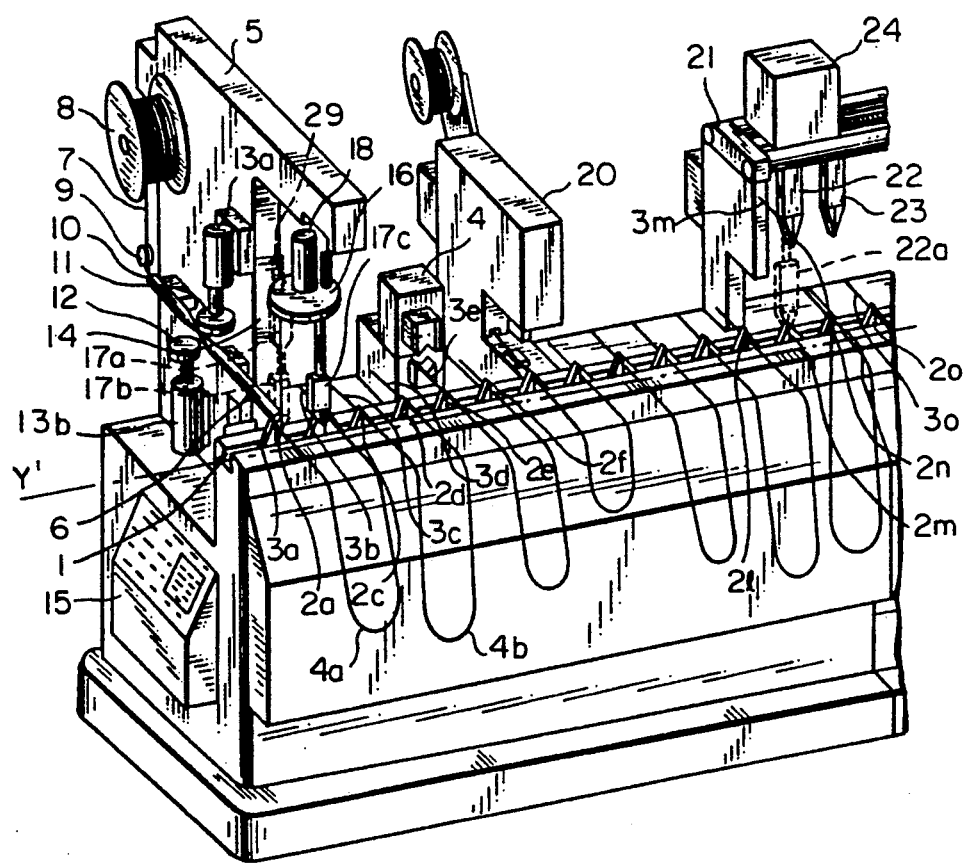
FIG. 1A shows a portion of the device in FIG. 1.

FIG. 1A shows a sample embodiment of unit (5) or loading unit which places the wire sections in the clamps. Wire (7) runs from spool (8) to return pulley (9) into a first tube (10) between two frictional wheels (11) and (12) which sandwich it, and finally into a second telescopic tube (14), section (6) of which represents the retractable part.

When the positioning of wire section (4a) begins, the transfer is in the position shown, but clamp (2a), which is in the axis of tube (14) whose retractable coaxial tube (6) is retracted and clamp (2b) are empty.

Using opening mechanisms activated by a jack (75) shown in FIG. 5 and not visible in FIG. 1, programmable computer (15) opens said clamps and takes out retractable tube (6) which slides between the open arms 72a and 73b of clamp (2a).

The computer activates motors (13a) and (13b) whose movements are synchronized and which drive frictional wheels (11) and (12), and thus unrolls a given length of wire which protrudes from tube (6). Then the computer orders the manipulator (16) whose loading clamp (17) shown in FIGS. 2 and 3 in greater detail is opened by jack (30) (FIG. 2) and moves downward from resting position (17a), shown in FIG. 1, to a first intermediary position (17b) also shown in FIG. 4, grasps the protruding end of wire using jack (29), moves back up to position (17a), then is rotated 180° around the axis of motor (18) and moves in a vertical translation into the second intermediary position (17c). During all of these movements, the computer controls motors (13a) and (13b) to unroll the wire in order to supply the wire needed to enable these movements to take place and to unroll the predetermined length of the section.

Figure 2:
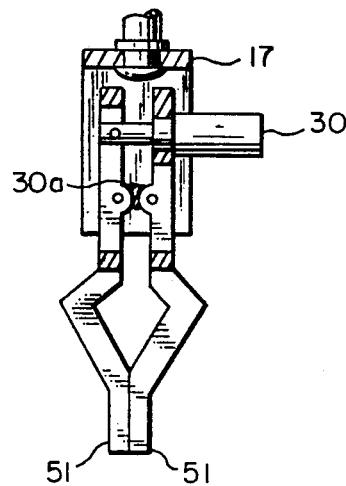
FIGS. 2 and 3 are respectively, a transverse section along section line B—B of FIG. 3 and an elevation view of a loading clamp.
Figure 3:
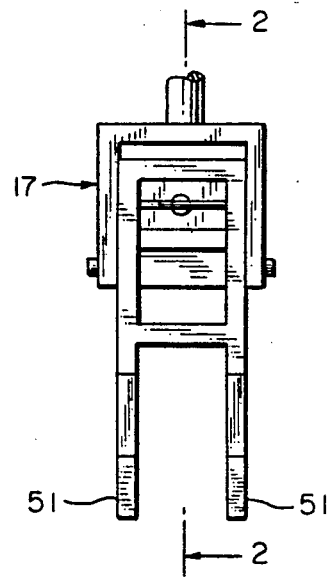

Loading clamp (17) FIGS. 2 and 3 holds the first end, or the downstream end of wire 4a, in position (17c) between its fingers (51) of loading clamp 17 and between the open arm 73a and 73b of end clamp (2b) as shown in FIGS. 4 and 5. This end is grasped by said clamp (2b) whose arms (73a) and (73b) are closed again by the computer, which next orders manipulator (16) to open the loading clamp 17 and return it to position (17a).

The computer next orders tube (6) to go back into tube (14), and clamp (2a) which grasps the second end of wire 4a to close. The computer then orders cutting clamp (19), shown in FIG. 1, to cut wire (7) at the retracted end of tube (6) thus creating the second end of wire (3a), or the upstream end of this section, and completes the positioning of wire section (4a) whose ends are held by clamps (2a) and (2b) with which conveyor (1) is endowed.

The ends are transferred along a transfer path which is rectilinear in this non-restrictive example (a circular conveyor would produce a circular path) to be fed to the various end processing units located along the transfer path of conveyor (1).

FIG. 1 shows that consecutive ends are fed in this way to various end processing units (4) and (20) arranged laterally along the transfer path of conveyor (1) so as not to impede the transfer of the ends, even if some parts of said units may overhang the transfer, such as the gripping components of interchange unit (21), for example.

The computer changes said ends in a predetermined manner using said end processing units by stripping some ends with the stripping unit (4) and crimping some of the connector ends using crimping unit (20) as shown in FIG. 1 as a nonrestrictive example.

In the special case in which the wire is an optical fiber, the processing units modify the ends by polishing them, stripping them, and by placing joining pieces on them.

The computer transfers and then feeds said ends to an interchange unit (21) which is placed laterally along said transfer path as shown in FIG. 1.

According to the advantageous sample embodiment in FIG. 1, the ends are held horizontally and all of the processing units are placed transversely on the same side of the transfer path, while the wire sections are placed on the other side, although this arrangement is strictly non-limitative, and according to another equally-advantageous sample embodiment, the ends would be held vertically and the sections would hang downward in alignment. This alternative solution is advantageous for holding the wire and limits problems caused by the waste created while the ends are being processed, which does not fall into the units located underneath at that time.

According to the advantageous sample embodiment in FIG. 1, which is described above, the wire sections are cut and placed in clamps on the conveyor (1) by loading unit (5), then the ends are modified by other units such as stripping unit (4), crimping unit (20), or any other unit placed upstream in this manner from interchange unit (21), conveyor (1) thus transferring the modified ends to the interchange unit.

According to another embodiment of the invention, the wire sections are cut and the ends modified without using conveyor (1) and units shown in FIG. 1, for example, manually, and the ends in this case can be fed manually or using a commercially-available manipulator endowed with at least one loading clamp (17), for example.

As shown in FIG. 1, the interchange unit modifies the order of the ends on the conveyor. The order of the ends upstream from the interchange unit is such that the wire sections are held one after the other. No ends of one section overlap the ends of another section, as shown in FIG. 1: sections (2a), (2b), (2c), (2d), (2e), and (2f).

As shown in FIG. 1, in the zone where the ends are fed to the interchange unit, clamps (2m), (2n), (2o), (2p), (2q), (2r), and (2s), the order of the ends was modified. The downstream ends of the three sections (4h), (4i), and (4j) were grouped in three consecutive clamps (2t), (2u), and (2v). The ends are rearranged.

FIG. 1 is a sample embodiment of interchange unit (21), which is a first manipulator endowed with at least one gripping mechanism (22) and (23), and a mechanism making it possible to move the unit from one point of said conveyor to another.

Gripping mechanisms (22) and (23) are the same type as that of loading clamp (17) with two jacks of the same type as (29) making it possible to move gripping mechanisms (22) and (23) up and down as shown in FIG. 9. Clamps (2m) and (2n), shown in FIG. 1A corresponding to gripping mechanisms (22) and (23), are associated with individual opening mechanisms, (27) shown in FIG. 5, but not shown in FIG. 1. Jacks (29) are advantageously electrical to allow movement downward to a variety of levels to get ends at different levels in the group clamp as shown in FIG. 13.

Figure 1B:
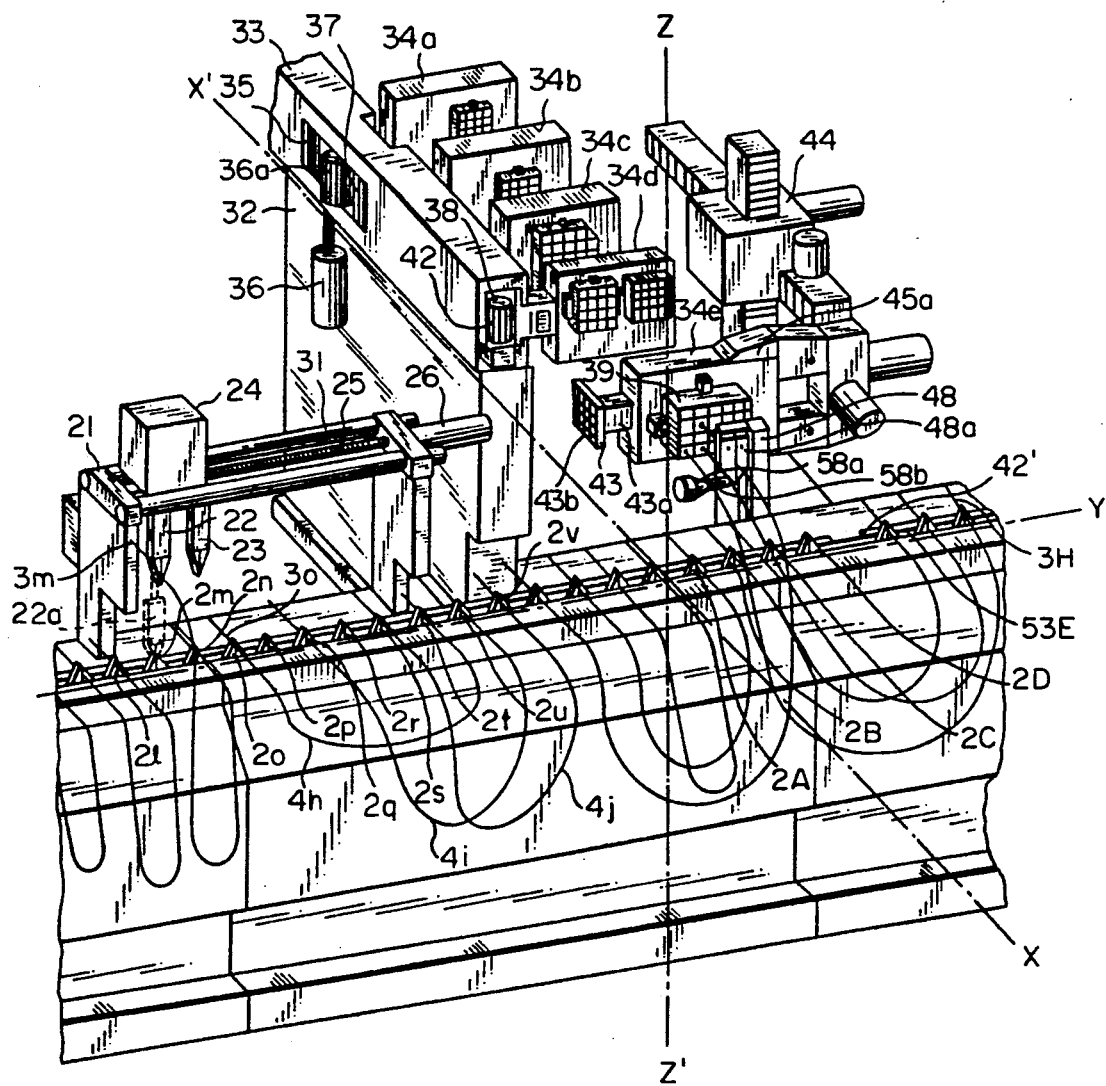
FIG. 1B shows another portion of the device of FIG. 1.

As shown in FIG. 1B the second part of this mechanism 21 is of the screw-nut type. Motor (26) drives endless screw (25) in rotation and the nut mounted on mobile unit (24) drives said unit (24) in translation, guided in a conventional manner by rails (31) parallel along the conveyor (1) so that the gripping components (22) and (23) move perpendicularly to the transfer path.

This enables the first manipulator or interchange connector (21) to grasp an end held by one of the clamps of conveyor (1) using each of said gripping mechanisms (22), (23) in the zone of action, or one of clamps (2m) to (2s), then to open said clamp and release said end from said clamp which becomes empty, then to move and engage said end in another empty clamp of conveyor (1).

In this way, according to FIG. 1, under the control of computer (15), said first manipulator or the interchange connector (21) can take end (3m) using gripping component (22). For this purpose, the computer opens and lowers gripping component (22) to lower position (22a) shown in phantom lines in FIGS. 1, 1a and 1b, closes it by activating jack (30) (FIG. 2) to grasp end (3m) held by clamp (2m) of the conveyor, then opens said clamp (2m) while raising the closed gripping component to the upper position (22) of gripping mechanisms shown in solid lines in FIGS. 1, 1a and 1b, releases said end of said clamp which becomes empty. These actions are is shown in FIG. 1.

Next, according to this example, the computer moves mobile unit (24) which holds gripping mechanism (22), (23) using endless screw (25), activating motor (26) to position component (22) perpendicularly to empty clamp (2p). At this time, it engages end (3m) in said empty clamp of conveyor (1), opening clamp (2p) using the opening device associated therewith, lowering the gripping mechanism to the lower position, closing the arms 73a and 74b of clamp (2p) on the end which is then grasped and held by said clamp (2p), opening the gripping component and moving it to an upper position.

If clamp (2p) is a group clamp, as shown in FIG. 13, it is not necessary to order it to open because the wires are held by deformation; instead, gripping mechanism 22 or 23 must be ordered to a predetermined level because the wires are arranged at different levels as shown in FIGS. 13 and 14.

This end having been transferred, the computer can use the same method to order another end to be transferred.

It is advantageous to have two gripping components as shown in FIG. 1, which makes it possible to move two ends in one round-trip movement, which takes less time than two consecutive movements. Another advantage is that one of the components can be used as a temporary storage mechanism for one end; in this way, if end (3m) held by clamp (2m) must be interchanged with end (3o) held by clamp (2o), the computer can order gripping component (22) to take end (3m), order gripping component (23) to take end (3o), order gripping component (22) to place end (3m) in clamp (2o), and finally to place end (3o) in clamp (2m).

It is advantageous to use several gripping mechanisms (22), (23) because the movements are reduced, which accelerates the action of the interchange unit.

FIG. 1 shows a wiring machine wherein the computer uses said clamps to transfer and feed several of said rearranged ends to at least one connection unit (32) placed laterally along said transfer path downstream from said interchange unit (21) and which comprises means to take one of said ends and connect it to one of said connectors 39 of the component clamps 34 it is processing, and under the control of computer (15) shown in FIG. 1, using said connection unit, some of said ends are taken into said clamps on said conveyor and connected to some of the connectors in a predetermined manner, said ends being taken in an order which may be different from the order in which they are fed to said connection unit. FIG. 1 shows a non-restrictive sample embodiment according to which at least one second manipulator (32) known as a connection manipulator is placed laterally along the transfer path downstream from the first manipulator or interchange connector (21).

FIG. 1 shows an advantageous variation of the process, according to which several of said second manipulators are placed along the transfer, only the first of which is shown on the partial view in FIG. 1. In the part which is not shown, conveyor (1) is continued and a second manipulator is placed in the same way as the first one. Said second manipulator connects the ends not connected by the first, such as (3H). Advantageously, several connection units are arranged laterally along said transfer path to make cable bundles and to interconnect automatically several connectors of various electrical components with conductor wire or optical fiber sections. This configuration makes it possible to make bundles which require the simultaneous connection of more connectors 39 than one component clamp can hold. Another advantage of this solution is that the implementation of several connection units allows a more effective organization of the groups of wires connected to the connectors on the same component clamp 34 and makes it possible to move toward the solution of using one component clamp per bundle branch. This arrangement prevents any untimely knotting or crossing of wires from different branches.

Advantageously, the production of bundles can be arranged by grouping all of the components of the same bundle branch together on one or more component clamps of the type shown in FIGS. 16 and 16.

According to a particular embodiment, said device according to the invention comprises an overall control device which controls the operation of said connection units so that said conveyor feeds an end corresponding to one of the particular connection units to said particular connection unit in response to a first signal emitted by said overall control device and said particular connection unit takes said end and connects it to a particular connector in response to a second signal emitted by said overall control device, and such that the ends which do not correspond to said particular connection unit skip said particular connection unit. According to a first advantageous embodiment, said overall control device is incorporated into the computer (15) software, which issues said signals, and according to a second embodiment, the previous embodiment is combined with a data transmission network and a conventional programmable robot on each of the connection units. The robot receives data in an appropriate coded form, and uses it to generate all or part of said signals according to an adapted program.

According to FIG. 1, a second conveyor (33) transverse to conveyor (1), of the known type having a synchronous belt such as conveyor (1) transports a set of clamps of the type which grasp and hold a component (34a), (34b), (34c), (34d), shown in detail in FIGS. 16 and 16, which are known as component clamps.

FIGS. 1, 15, and 16 show sample embodiments of component clamps. As shown in FIG. 15, component clamp (34e) comprising a base (43d) whose bottom surface is endowed with teeth (43b) forming two racks along axes parallel to X'X and Z'Z; FIG. 6 provides a sample embodiment of (43b) of said base (43d). Teeth (43b) can also mesh with the teeth of the synchronous belt (37) of the second conveyor (33) as well as with those of the synchronous belt with which the first conveyor (1) is endowed.

In the example in FIG. 1, axis Z'Z is vertical, axis Y'Y is horizontal and parallel to the first conveyor (1), and X'X is also horizontal. These three axes are perpendicular in pairs.

An operator manually engages the different component clamps one by one at the upstream end of conveyor (33). For this purpose, he slides base (43d) into cut-out (43), engaging in a vertical movement, the apex of the teeth (43b) of the base (43d) in the complementary shape of the synchronous belt (37) formed by the space between two teeth; the identical complementary form details of the base (43d) and the belt (37) are shown in FIG. 4. After a clamp (34) has been positioned, the conveyor transfers clamp (34a) to (34b) which allows the operator to slide a second component clamp into place through cut-out (42). This operation can be advantageously automated using a removable component clamp loader and a computer-controlled mechanism which positions them individually. In this way, the operator only intervenes to change said loader in which several component clamps are stacked.

Motor (36) drives the toothed pinion (36a) which is solidary with its axis and which meshes on synchronous belt (37) along the X'X axis. Said pinion and belt are shown in FIG. 1 through aperture (35) in conveyor (33). Said belt is stretched and rolls at its two ends over two wheels such as wheel (38). Computer (15) orders said motor to move the synchronous belt and the clamps it drives until a clamp is transferred to the front end of (33) conveyor at the level represented by component clamp (34d).

According to the embodiment in FIG. 1, the front end of the conveyor (33) is open so that the clamp located in front can move out.

FIG. 1 shows a sample embodiment of the third manipulator (44) which is a manipulator of a known type, having three degrees of freedom in translation along the three axes, X'X, Y'Y, and Z'Z, which can be the rack and pinion type as shown schematically, and one degree of freedom in rotation around an axis parallel to X'X.

The computer orders said third manipulator to grasp in its empty jaws (45a) (45b) the clamp transferred to the front end of the second conveyor at the level shown by component clamp (34d). It then orders said third manipulator to move along axis X'X synchronously with conveyor (33) long enough to release the base (43d) from the teeth of belt (37). In this case, the third manipulator command is the only one maintained to bring said component clamp into position (34e) in FIG. 1, making two translations along YY' and X'X and one rotation causing the component clamp (34e) to rotate 90° around an axis parallel to X'X in order to bring its base (43d) to horizontal position, with teeth (43b) downward.

FIG. 1 shows a sample embodiment of manipulator (48) shown in greater detail in FIG. 17, which can alternatively be a commercially-available manipulator. Jaws (48a) and (48b) are held by said manipulator (48) which makes it possible, under the control of the computer, to take one end out of one of clamps (2A), (2B), (2C), (2D), or (2E) and to feed it in a fixed position opposite the component clamp so that the axis of said end is parallel to the X'X axis.

The function of the component clamps shown in FIGS. 1, 15, and 16 is to grasp and hold at least one connector so that the axes of the component clamps (34) are directed along the X'X axis.

The computer moves connector (39) which is held by component clamp (34e) along the Y'Y and Z'Z axes, in order to align the connector (39) corresponding to the end held by the manipulator (48) and then inserts this end through a movement along the X'X axis in order to insert and connect the end with the connector positioned opposite it.

The connector is predetermined according to the end, and can be one of a number of connectors held in the component clamp placed in the field of action of said connection manipulator, i.e., one of the connector, held by clamp (34e) which itself is held by jaws (45a) and (45b).

The computer then issues commands so that jaws (48a) and (48b) release the end which has just been connected, and the third manipulator retracts so that another end-connecting cycle can resume, after having advantageously folded the plugged-in wire downward as will be discussed below.

When the last end to be connected to the connector or connector, carried by component clamp (34e) held by jaws (45a) and (45b) is connected, the computer orders the third manipulator to position the component clamp on conveyor (1) by sliding base (43d) in a movement along X'X, on synchronous belt conveyor (1) in the same way as it had been slid on synchronous belt (33). Said component clamp is positioned through cut-out (42') in the area (53E) which the computer left open on conveyor (1). For this purpose, the computer did not load any other clamp at this location.

FIG. 12 is a partial detailed rear view along an AA section of the release (42') performed on conveyor (1) at the clamp (2E) in FIG. 1 for the positioning of the component clamp on the conveyor. This release is identical to the release (42) performed on conveyor (33).

As shown in FIG. 12, belt (37) has the same width as the side of base (43d) which is advantageously square. The thickness of base (43d) is such that it is trapped between belt (37) and parts (1a) and (1b) of the conveyor.

The cut-out is located along the circulation path in which are trapped the bases which are driven by the active cable of belt (37a) whose slack cable circulates in the lower part of the conveyor.

A lock (52) is able to move in translation. It is activated by the jack (52') fixed on the lock one side, and on the conveyor on the other side, and moves into position (52a) to block aperture (42) partially and to prevent the bases from coming out. The inside vertical edges of cut-out (1c) are beveled to prevent jamming.

In this non-restrictive sample embodiment of the invention, conveyor (1) advantageously transports clamps of different types, and advantageously in a process according to the invention, said conveyor transports a variety of types of clamps.

The manipulator (48) shown in FIGS. 1 and 17 comprises a complementary device to keep wires which have already been connected out of the way of ends still circulating on the conveyor. This device comprises a rod (58b) which ends with a cylindrical stop (58a). According to the example embodiment in FIG. 1, the wires which are already connected are held by rod (58b) well above the ends which are circulating underneath so as not to get in their way. Stop (58a) prevents the wires from sliding when manipulator (48) is moved along the Y'Y axis and the length of rod (48b) is at least equal to the amplitude of said movement. When the latter end has been inserted into the components held by component clamp (34e), manipulator (44) is moved so that the connected wires pass above manipulator (48).

According to an advantageous embodiment, computer (15) orders the interchange unit to arrange the ends in an advantageous order which makes it possible to simplify manipulator (48) by eliminating the movement along the Y'Y axis and maintaining only a fixed movement along the Z'Z axis, which is advantageously achieved in this case through the use of a jack. Manipulator (48) in this case is the same type as manipulator (16) or (21).

FIG. 17 shows one perspective of an embodiment of manipulator (48). Carriage (88) moves in a straight line along rack (89) under the action of motor (90). Said carriage holds a bracket (91) endowed with a rack (91a) which moves vertically under the action of motor (92); table (93) comprises a cut-out to allow the bracket-rack complex (91) full freedom of movement.

The clamp which grasps using its arms (48a) and (48b) is of the same type as the clamp shown in FIGS. 2 and 3.

Rod (58b) which ends with stop (58a) is fixed by bracket (58c) to table (93) positioned on the chassis of connection unit (32); said rod is held secure at a higher level than the clamps circulating on conveyor (1) in order to avoid any interference.

A preferential order of connection is one such that, when the ends are connected in a given order, the sections of wire corresponding to ends which are already plugged in and which are hanging do not cover the connector sockets remaining to be connected.

In a device according to the invention which connects the ends in a preferential order, it is advantageous to accentuate the downward curve which the wires naturally assume under the effects of their weight so that the connector sockets can be clearly disengaged, and a process according to the invention comprises means to fold the connected wires on the side opposite that of the sockets remaining to be connected. For example, when one end is plugged in, a manipulator slides, in a downward movement between the front surface of connector (39) and manipulator (48), a brush or part covered with a plastic element so as not to damage the wires, and moves away before returning upward.

FIG. 1 describes another advantageous embodiment to accentuate the curve; connector (39) is approached by clamp arms (48a), (48b) covered with a plastic element; this action can potentially be supplemented by a downward movement of said arm, which in this way fold the wires on the side opposite that of the sockets remaining to be connected, or downward, and disengage the connector sockets remaining to be connected, avoiding any mechanical interference.

FIG. 7 shows a sample preferential order of connecting two connectors (39) schematically depicted as connectors (55) and (56), knowing that the Z'Z axis is vertical and directed upward. The ends should be connected in the order defined by circuit B'B shown in FIG. 7 as a phantom line. The first end to be connected is thus (58a), and the last is (58t).

The preferential order which has been defined is not unique; more generally, the different levels must be filled individually in succession, preferably while making the connections in only one direction, i.e., in an order which does not require an end to be connected between two ends which have already been inserted at the same level.

For example, the bundle described in FIG. 8 comprises nine sections of wires which each connect a socket of connector (55) to a socket of connector (56), and, for example, according to an interconnection solution:

The ends of section (57a): downstream connected to socket (55a) and upstream connected to socket (56i);

The ends of section (57b): downstream connected to socket (55b) and upstream connected to socket (56h);

The ends of section (57c): downstream connected to socket (55g) and upstream connected to socket (56g);

The ends of section (57d): downstream connected to socket (55c) and upstream connected to socket (56c);

The ends of section (57e): downstream connected to socket (55h) and upstream connected to socket (56f);

The ends of section (57f): downstream connected to socket (55d) and upstream connected to socket (56b);

The ends of section (57g): downstream connected to socket (55i) and upstream connected to socket (56e);

The ends of section (57h): downstream connected to socket (55e) and upstream connected to socket (56a);

The ends of section (57i): downstream connected to socket (55j) and upstream connected to socket (56d);

To connect connector (55) in a preferential order, for example, the downstream ends must be fed to the connection unit 32 in the following advantageous order of connection: (55a), (55b), (55c), (55d), (55e), (55j), (55i), (55h), and (55g).

The computer program predetermined by the operator orders the wires to be produced in the advantageous order in which the downstream ends must be placed on connector (55) according to the above advantageous connection order, i.e., (55a), (55b), 55c), (55d), (55e), (55j), (55i), (55h), and (55g) which will be the farthest upstream on the conveyor, and the wire sections are cut and placed on the transfer in the following order: (57a), (57b), (57d), (57f), (57h), (57i), (57g), (57e), and (57c) which will be the farthest upstream.

The ends are fed in front of the interchange unit in the following order: (57a) downstream, (57a) upstream, (57b) downstream, (57b) upstream, (57d) downstream, (57d) upstream, (57f) downstream, (57f) upstream, (57h) downstream, (57h) upstream, (57i) downstream, (57i) upstream, (57g) downstream, (57g) upstream, (57e) downstream, (57e) upstream, (57c) farthest upstream.

This order is advantageous for connector (55), but is not optimum for connector (56), and to connect housing (56) in a preferential order, for example, the ends must be fed to the connection unit in the following advantageous connection order: (56a), (56b), (56c), (56f), (56e), (56d), (56g), (56h), and (56i) which amounts to feeding the upstream ends in the following order: (57h), (57f), (57d), (57e), (57g), (57i), (57c), (57b), and finally (57a), which will be the farthest upstream on the conveyor.

If the two connectors are held on the same component clamp 34e, the program predetermined by the operator can order the upstream ends to be connected to the connector to be interchanged two by two, producing the advantageous order wherein the upstream ends which go on connector (56) must be placed in the above advantageous connection order, without requiring that the set of ends which go on connector (55) be separated from those which go on housing (56) i.e.: (57a) downstream, (57h) upstream, (57b) downstream, (57f) upstream, (57d) downstream, (57d) upstream, (57f) downstream (57e) upstream, (57h) downstream, (57g) upstream, (57i) downstream, (57i) upstream, (57g) downstream, (57c) upstream, (57e) downstream, (57b) upstream, (57c) downstream, and finally (57a) upstream.

If the two connectors are held on two different component clamps, the program predetermined by the operator can advantageously order nine empty clamps to be placed on the conveyor upstream from the group of sections and to which the interchange unit will transfer the nine ends to be connected to connector (56) producing the advantageous order in which the upstream ends which go on connector (56) must be placed according to the above advantageous connection order, and the set of ends which go on connector (55) will thus be separated from those which go on connector (56), with the order after the interchange unit being as follows: downstream units to be connected to connector (56):

(57a), (57b), (57d), (57f), (57h), (57i), (57g), (57e), (57c), then all of the upstream ends to be connected to connector (56):

(57h), (57f), (57d), (57e), (57g), (57i), (57c), (57b), and finally (57a) which will be the farthest upstream on the conveyor.

It must be noted that said second solution can also be used if the two connectors are held in the same component clamp and in an advantageous variation of the process according to the invention, because the interchange time is generally faster, empty clamps are fed to said interchange unit, some of said ends are grasped and taken in other clamps holding ends, using the interchange unit, and said ends taken in some of said empty clamps are moved.

Another advantage of the invention is to allow the number of connectors which must be fed simultaneously on only one or several connection units to be limited, because this makes it possible to connect different connectors successively.

This advantageously reduces the number of connection units necessary and the number of connectors on the same component clamp, thus reducing the cost of the wiring machine and increasing its flexibility.

This also simplifies the connection units, which no longer have to manage the insertion order of the wires and thus in an advantageous process according to the invention, the connection unit is used to take some of said ends on said conveyor and arrange them in a predetermined manner in a connector, taking them in the same order as the order in which said ends are brought to said connection unit.

According to a preferred embodiment, a device according to the invention comprises a control mechanism which controls the operation of said interchange unit in order to rearrange the ends in a preferential order for said connection unit. The control device can advantageously be programmed and incorporated into computer (15).

FIGS. 9 and 10 show a preferred embodiment of the invention wherein the interchange unit advantageously rearranges all or part of the wire ends by arranging them in group or unit clamps, i.e., clamps which can grasp and hold several wires in a given order and in a limited space as shown in FIGS. 13 and 14.

Loading unit (5) and end processing units (20) are only shown in FIG. 10, while interchange unit (21) and two connection units are symbolized by (32) and (32'); it is advantageous to have several loading units on such a device to obtain a variety of wires.

There is a device (60a) at the upstream end of conveyor (1) and a similar device (60b) at the downstream end.

Parallel to conveyor (1) is a second accumulation conveyor (1') which can transfer the same clamps as the first, which is of the known friction belt type and which moves oppositely from the first so as to move the clamps from downstream to upstream. FIG. 11 provides a schematic view of one embodiment of two similar devices (60a) and (60b), only the location of which is shown schematically on FIG. 1, making it possible to transfer the clamps from one conveyor to the other.

FIG. 11 shows an embodiment of device (60b) composed primarily of a square cycle manipulator with two degrees of freedom endowed with a clamp (61) which grasps base (43d) at the foot (43a), a clamp (2X), which withdraws said clamp through a cut-out (42") in the conveyor (1) in a movement along the X'X axis, which lowers it to the level of conveyor (1') to position (61a), which transports and positions the clamp on conveyor (1') through cut-out (42''') and returns empty to begin the same cycle again. This manipulator can be a commercially-available two-axis manipulator, or as shown in FIG. 11, a carriage (80) which moves along a rack (81) under the effect of motor (79) driving a pinion which meshes on said rack. Jack (82) which is being carried by and moves along with carriage (80) is advantageously electrical so that it can stop at different intermediary positions and satisfy all variations of neighboring devices of (60b). Clamp (61) is advantageously made in the same manner to be able to grasp the foot of an end clamp, a group clamp, or a component clamp, indiscriminately. Such a clamp (61) can be made by juxtaposing two clamps and by ordering the clamp corresponding to the position of the clamp foot to move.

FIG. 9 shows that return accumulation conveyor (1') also comprises a stop device (64) which holds all of the clamps stored on said conveyor and only allows them to proceed one by one to stop (63) on command of computer (15). This stop moves along the X'X axis, and blocks the clamp at foot (42a). To allow only one clamp to proceed, the computer retracts said stop long enough to allow the foot of said clamp to proceed, and reengages said stop to block the foot of the following clamp. This stop can be made by a simple jack attached to the conveyer, and whose rod moves along the X'X axis to interfere with the foot of the clamp after it has come out and not to impede the movement of the clamp after it has moved back in.

According to the sample embodiment in FIG. 9 and FIG. 10, conveyors (65a) and (65b) are also endowed with a stop (64). As for conveyors (1') and (65a), the computer can, depending on a predetermined program, order a stop, for example, according to FIGS. 9 and 10, release a conveyor clamp (24) shown on conveyor (65a) of FIG. 9 to which reference was just made on a fixed stop (63), grasp said clamp (2Y) using clamp (61) of device (60a) and disengage it passing through all of the conveyors which comprise releases such as (42) on both surfaces along the X'X axis. Conveyor (65b) is not designed to store component clamps for loading device (60a) to position them on conveyor (1); there are no fixed stops (63) and said component clamps are driven by friction to the end of conveyor (65b) from which they fall freely into a collection box (69). An operator collects these empty component clamps, places them in the sockets of adapted components and then stacks them in loaders (40) or (40'').

According to another variation of a preferred embodiment, conveyor (65b) comprises stops and, like conveyor (65a), allows component clamps to be positioned on conveyor (1). Along the transfer path, said component clamp is fed to an automatic component loading unit in a component clamp made, for example, by combining a vibrating bowl and a manipulator of the known types, which automatically positions the components in the sockets of said component clamp. In said solution, the connection unit takes the component clamp on conveyor (1) instead of conveyor (33).

According to another variation which is a combination of the means of the two preceding embodiments, the components are positioned automatically by an automatic component positioning unit located on a conveyor which connects conveyor (65b) to conveyors (33). This new conveyor is endowed with loading devices of type (60a) which transfer component clamps to conveyors such as (33). FIGS. 9 and 10 show the sorting device (66) which is a subunit of device (60a) in which the vertical translation movement is eliminated. Stop (64a) can be retracted to allow the clamps which do not have to be transferred to one of conveyors (65a) or (65b) to continue on conveyor (1').

These FIGS. 9 and 10 show a device according to the invention which, under a preferred embodiment, comprises clamps of various types and having specific uses intended for the automatic connection of conductor wire or optical fiber section ends to connectors, which can be transported by the same conveyor on component clamps and can be separated from said conveyor, and which comprise all the same means to interface with said conveyor and an automatically-legible inscription allowing the type to be identified.

A remote reader (68), for example, a bar code-type device, is placed along conveyor (1'); said reader reads the type of clamp (2Z) stopped by stop (64b) and transmits a characteristic signal for this type to computer (15). Based on this signal or on this type information, the computer can order the stop (64b) to allow clamp (2Z) to abut against stop (63a) activated at that time, then to retract said stop if the clamp must be transferred to conveyor (1'), or to transfer this clamp using a clamp (61) to conveyors (65a) or (65b).

FIG. 9 shows conveyors (65a) (65b) which are the accumulation type and are endowed with a friction belt such as conveyor (1') and which return the clamps in the upstream direction of the wiring machine and store said clamps which device (66) has thus sorted.

FIGS. 4, 5, 6, and 13 show a sample embodiment of such an interface mechanism composed of a base (43d) endowed with a double rack of teeth (43b), a foot (43a) on which is inscribed a bar code (43c) representing at least the type of clamp and advantageously its individual number. According to a preferred embodiment, a device according to the invention advantageously comprises clamps of various types and having specific uses intended for the automatic connection of conductor wire or optical fiber section ends to connectors which can be transported on component clamps by the same conveyor and can be separated from said conveyor, and which can be mechanically engaged thereon or withdrawn therefrom, and which comprise all of the same means to interface with said conveyor and an automatically-legible inscription allowing the type to be identified.

Advantageously, a device according to the invention also comprises at least two different types of clamps and means to sort said clamps by type.

FIGS. 9 and 10 show a sample embodiment of interchange unit (21'). This unit is composed of a first subunit (21a) of the same type as interchange unit (21) and a subunit (21'b) which is of the same type as device (60b).

In this way, according to said figures, after having taken an empty clamp on conveyor (1), subunit (21'b) transfers the empty clamp to return conveyor (1') in the same way as device (60b). Conveyor (1') has a stop (64c) which is also controlled by computer (15) in order to prevent collisions on conveyor (1') between clamps transferring unit (21') and those already fed on the conveyor and transferred by other units or by device (60b).

According to a preferred embodiment shown on FIGS. 9 and 10, conveyor (1) is made by juxtaposition of two conveyors placed in succession (1a) and (1b) so that their synchronous belts allow the clamps to be transferred from one to the other. Each of said conveyors is endowed with its own motorization and can be moved independently of the other. Advantageously, the two conveyors (1a) and (1b) are juxtaposed opposite one of the last positions covered by the interchange unit and a clamp ejection device is associated with the downstream end of the first conveyor (1a). According to the non-restrictive example shown in FIGS. 9 and 10, this makes it possible, when a clamp has been ejected and according to an advantageous command mode, for computer (15) to move only conveyor (1a) to fill the empty place. In this way, there are no useless empty places on conveyor (1b) and interchange unit (21') can transfer a great number of ends into the same group clamp, regardless of the number of clamps covered by the movement of clamps such as clamp (22).

FIGS. 9 and 10 show a sample embodiment of connection units such as unit (32) shown in FIG. 1. Said unit is composed of a first subunit (32'a) which is of the same type as interchange unit (32) and a subunit (32'b) which is of the same type as device (60b).

In addition to device (60b), subunit (32'b) has the possibility of holding the clamp in the intermediary position shown in FIG. 10 as (53'I), which is an elevated position so that the wire or wires, if it is a group clamp, which it holds do not interfere with the clamps transported by conveyor (1). This function can be performed by a manipulator of the known type which moves the clamp under the control of computer (15) or else advantageously by a device such as the one in FIG. 11 with which the end or group clamp is transferred to and held in position (53'I) by moving carriage (80) to the upper end (81a) of the rack and by stopping electric jack (82) in an intermediary position.

In this way, according to the same figures, after having removed a clamp on conveyor (1) subunit (32'b) transfers and holds these clamp in the elevated position shown while subunit (32'b) takes the wire end held in the clamp. Subunit (32'a) then transfers the empty clamp conveyor (1') in the same way as device (60b). Conveyor (1') holds a stop (64d) which is also controlled by computer (15) so as to prevent collisions on conveyor (1) between clamps transferred by unit (32') with those already present on the conveyor and transferred by ther units or by device (60b).

Advantageously, in a process according to the invention, said connection unit and said conveyor are associated with means to withdraw at least one of said clamps from said conveyor and feed it to the connection unit. Advantageously, said clamp is recycled without being put back on said conveyor. In this way, while the connection unit connects the wire or wires present on the removed transfer clamp, the clamps immediately upstream from said removed clamp and which hold the ends which are not to be connected by said connection unit can continue.

According to another embodiment, subunit (32'b) does not feed the clamp in an intermediary position and its only function is to eject and recycle the clamp emptied of its wire. Advantageously, the clamps discharged of their ends by the connection unit ar withdrawn from said conveyor.

FIGS. 4, 5, and 6 show an embodiment of end clamps and their opening system (27). Such a clamp comprises two arms (73a), (73b) which hold the wire in collaboration with a piston (74a) inside a volume (83) formed by the intersection of the corresponding forms of said arms and piston. The arms close under the action of springs (73f), (73e) pivoting around axes (73d) and (73c); the piston is pushed upward by the action of spring (74b).

FIG. 5 shows a sample embodiment of the opening system (27) which comprises a part (77) which moves on axes (76) and is moved by jack (75). The end clamp comprises two lugs (78) attached to the arms. In the position shown in FIG. 5, the opening system does not act on the clamp. When jack (75) is activated, part (77) presses against lugs (78) and opens the arm.

FIGS. 9 and 10 also show the succession of operations performed to produce the bundle shown in FIG. 8, being manufactured using a continuous cycle.

Said FIGS. 9 and 10 show the first phase of production at the zone labelled (I), which runs from clamp (2d') shown on conveyor (1) of FIG. 9 to group clamp (72w):

clamps (72v), (72w) and eighteen end clamps (2d') to (2u').

The conveyor transfers said clamps in front of different units (5), (4), and (20) which position or modify the ends.

The end clamps hold the ends of the nine wires in the bundle positioned by the loading unit; said wires are regularly placed in pairs of consecutive clamps.

The wires are arranged in the following order from upstream to downstream, which is the inverse of the optimum order used above, according to the needs of this particular embodiment: (57a), (57b'), (57d), (57f), (57h), (57i), (57g), (57e), and (57c) which will be the farthest downstream.

Said FIGS. 9 and 10 show the second phase of production at the zone labelled (II), which runs from group clamp (72v) to group clamp (72C):

The group clamps are placed in the field of action of transfer clamps (22) and (23) (see FIG. 1) of interchange unit (21').

The end clamp which is farthest downstream is empty and is being ejected by subunit (21'a) of said interchange unit to the return circuit where it will be sorted for reuse, so that another end clamp may be brought to the same position to continue to transfer ends into group clamps (72A) and (72B), while only moving transfer (1a), and thus without moving said group clamps.

The nine upstream ends are all stacked in a set of zig-zagged rods of clamp (72B) and the order from top to bottom, i.e., the order in which the ends will be unstacked, is as follows: (57h'), (57f), (57d), (57e), (57g), (57i), (57c), (57b), and finally (57a); this order is the preferential order of connection defined above.

The nine upstream ends thus stacked in group clamp (72B) join the five downstream ends which have already been stacked in group clamp (72A) along strand (71a) and the four downstream ends still held individually in end clips, along four dispersed wires.

Only five of the nine downstream ends are stacked in a set of zig-zagged rods of clamp (72A) in the following order from top to bottom: (57h'), (57i'), (57g), (57e), (57c). The four remaining ends will be taken and stacked, and by the interchange unit or transfer unit so that the order from top to bottom once the phase is terminated, i.e., the order in which the ends will be unstacked will be: (57a), (57b), (57d), (57f), (57h'), (57i'), (57g), (57e), (57c), this order being the above-defined preferred connection order.

The example was selected in order to explain a particular operation during the positioning of wires in the group clamps taking into account the limited length of the interchange unit and the field which its clamps cover.

In the example shown, the first end to be stacked in group clamp (72B) is the downstream end of wire (57a); said end is held in end clamp (2e') which is farthest downstream, while the group clamp is farthest upstream and the distance between said clamps is nineteen steps; now, when group clamp 72B) is in the position shown in FIG. 9, the interchange unit reaches at most the level of clamp (72v), or a distance of thirteen steps.

A first solution is to limit production only to cases which the interchange unit can process directly, but it is advantageous for the interchange unit to transfer some wires temporarily to a standby position so that they can be taken later and arranged in a preferred order using this method; said advantageous embodiment makes it possible to expand the field of action of the device according to the invention without increasing the zone covered by the interchange unit.

Group clamp (72B) is in accordance with the sample embodiment shown by FIGS. 13 and 14, which demonstrates that a group clamp comprises three sets of storage rods: (L), (M), and (N).

According to an advantageous process, when the interchange unit does not have access to an end which it must stack below an end held by an end clamp to be transferred to the ejection subunit (21'a), the computer orders the following operating sequence:

a. The interchange unit takes and stacks said end in rod set (N);

b. Operation (a) is repeated as many times as needed until the end to be stacked underneath reaches the field of the interchange unit, which takes it and positions it in rod set (L); the following sequence intervenes at this time:

c. If the highest of the ends stacked in rods (N) must come immediately above the last end stacked in rods (L), the interchange unit takes and transfers said end to rods (L) and the cycle continues to phase (d) below;

Otherwise, it transfers it into rods (L) and phase (b) resumes;

d. Computer 15 knows the preprogrammed transfer sequence, and if there is another critical end which satisfies phase (c), i.e., which must come immediately above the last end stacked in rods (L), the computer orders the interchange unit to resume cycle c, taking the ends in rod set (M) or (N) which holds said critical end, and no longer systematically in rod set (N);

Otherwise, the computer suspends the execution of this cycle and the interchange unit continues to stack the ends it grasps on the transfer, either until the turn of one of the ends stored in rods (M) or (N) comes, and in this case the computer orders that phase (d) be executed; or until the turn of an end which the interchange unit cannot grasp comes, and in this case the computer orders the interchange unit to transfer all of the ends on rods (M) to rods (N), then to execute phase (a).

According to another advantageous embodiment, rods (M) and (N) or a multiplicity of such rods do not have to be solidary with the group clamps.

The solution according to which said rods are solidary with the clamps is equally advantageous because the operating sequence described in the above process must be performed simultaneously as many times as there are clamps in the group to be processed simultaneously; the modularity of the group clamps and rods (B) and (C) correspond to the problem to be solved.

FIGS. 9 and 10 show the third phase of production at the zone labelled (III), which runs from group clamp (72D) to and not including component clamp (34e):

Connection unit (40') is in the process of connecting, in preferential order, the downstream ends held in group clamp (72E) to connector (39') attached to component clamp (34'); the downstream ends remaining to be connected form the strand of wires (71c) between group clamps (72E) and (72F), and those already connected form strand (71d) between connector (39') and group clamp (72F);

After the last end is inserted, under the control of the computer, emptied group clamp (72E) is recycled and replaced by clamp (72D), the conveyor is advanced two steps (the computer orders the different other units to execute the actions corresponding to each step) and connection unit (40') places component clamp on the conveyor in the place left empty on the transfer;

Connection unit (40") is in the process of connecting in preferential order the upstream ends held in group clamp (72G) to connector (39") shown on conveyor 1 of FIG. 9 attached to component clamp (34");

After the last end is inserted, group clamp (72G) shown in FIG. 9 is recycled and replaced by clamp (72D), connection unit (40") places the component clamp on the conveyor in the place left open on the transfer.

These FIGS. 9 and 10 show the fourth phase of production at the zone labelled (IV), which runs from component clamp (34e) to the end of conveyor (1b):

When the bundle is completed, it must be removed before the empty clamps are recycled;

An operator intervenes in this zone to take the bundles. When a bundle is completed and transferred to the downstream end of conveyor (1), the computer suspends the operation of the wiring machine after having opened end clamps (3) located, if applicable, in said zone IV, through the use of opening mechanisms (27) which are individually associated therewith. After the operator has released all of the wires from the clamps, has removed all of the connectors from the component clamps holding them and thus has the completed bundle, he presses button (62) to tell the computer that his operation is completed. The computer then resumes sending production orders predetermined and programmed by the operator before the production cycle in progress begins.

In the embodiments of the invention described above, the ends fed to the interchange and connection units are each in a clamp. This presents a problem because the wire must be longer than the distance between two clamps and said distance is equal to the number of steps between the clamps.

To prevent this problem and expand the capacities of the wiring machine, some of said clamps make it possible to grasp and hold several wires in a given order and in a limited space.

FIGS. 13 and 14 represent one embodiment as a nonrestrictive example of such a clamp, comprising, like the other clamps, the same means to interface with said conveyor and an automatically-legible inscription making it possible to identify the type.

Said type of clamp has a plate (69) to which a plurality of rods (70) is attached. The rods are installed along axes such as L'L, M'M and N'N which themselves are parallel to the teeth in the same direction as lower surface (43b).

The distances between the axes of the rods placed on either side of axes L'L, M'M, and N'N is of the same magnitude as the diameter of one of the rods and is smaller than the length represented by this diameter plus the diameter of the smallest-diameter wire it must hold. The distance between the two right tangents closest to the two groups of rods is less than the length represented by the diameter of the smallest-diameter wire it must hold.

The wire which is deformed to circulate alternatively between rods (70a), (70e), (70b), (70d), and (70c) is held by deformation. Advantageously, the upper part of the rods is cut in an inward taper as shown in FIG. 13, so that a stretched wire fed along an axis such as L'L is guided by said tapers to become engaged and to circulate alternatively between the rods arranged in a zig-zag.

Such a clamp is capable of holding wires of several diameters which must nonetheless remain within a few units of a diameter ratio for the flexible wires which are generally used, or within a smaller ratio if the wires are more rigid.

Several wires admitted in this manner can be stacked vertically in the same row arranged in a zig-zag such as (L), such as (M), or such as (N). These wires are kept in order because they cannot change levels, and a multiplicity of wires is held in a limited space.

Such a clamp of the type to grasp and hold several wire ends which comprises a group of rods arranged in a zig-zag to hold the wires is a preferred device according to the invention.

Nonetheless, it should be noted that the wires in the same row can be unstacked in the opposite order in which they were arranged.

Group clamps are more specially adapted to the transfer zone which begins at the interchange unit and extends to the connection units, and according to an advantageous embodiment, clamps of this type are introduced on the conveyor at the interchange unit and are withdrawn from said conveyor by the connection units.

Advantageously, the interchange unit transfers some of said ends to clamps making it possible to grasp and hold several wires in a given order and in a limited space.

The interchange unit in this case has the function of arranging the ends held two by two in two consecutive clamps of the type which makes it possible to grasp and hold several wires in a given order and in a limited space.

FIGS. 15 and 16 show a front view and a transverse section of an embodiment of a component clamp according to the invention. In addition to base (43d) and a foot (43a), this is composed of a flat rectangular panel or plate (84) comprising means to detachably fasten each connector in a specific position of said panel so that the adapted sockets of said connectors are perpendicular to said panel.

FIGS. 15 and 16 show a preferred embodiment in which the means to detachably attach the connectors to the panel are sockets (86) which pass through panel (84) and which are opened at their two ends.

FIGS. 15 and 16 show a preferred embodiment in which sockets (86) all are the same size, for example, a square whose side is greater than the largest dimension of the largest component. In this case, all of said clamps are identical and each connector is placed in an adaptor socket (85) which comprises standard means of attachment to said clamp and the specific means of attachment to said component.

The form detail (85a) of the adaptor socket is intended to absorb the thrust effort which exists upon connection, and which presses against the front surface of panel (84), i.e., the surface located on the side of connection manipulator (48).

The attachment mechanisms made according to the component and generally composed simply of a single elastic blade pressing against the connector are solidary with said adaptor socket which also comprises a cut-out adapted to the shape of the connector.

The adaptor socket preferably comprises a cut-out (85a) which issues on either side and a form detail (85b) which absorbs the stress of inserting the end into the component. In this way, the connector component clamps can not only be accessed from the side from which the ends are introduced into said clamps, but also from the opposite side of the clamps, which makes it possible to test said connections automatically.

Connectors (39) held on the same component clamp can advantageously be all component of the same branch of a bundle, and the adapted sockets can be of different types such as (87a) which is a blind female socket, (87b) which is a male socket, and (87c) which is a socket issuing from connector (39c).

FIGS. 18 and 19 show the interchange unit according to a partial perspective view of the invention.

FIG. 18 shows an embodiment of partial storage executed modularly using clamps (72) holding three sets of rods arranged in a zig-zag.

FIG. 19 shows an embodiment of partial storage executed in a fixed manner (89). Carriage (24) has means including jack (24') to move along the X'X axis allowing clamps (22) and (23) to transfer the wires into rod device (89), clamps (72) holding a set of rods arranged in a zig-zag.

What is claimed is:

1. A process for the automatic connection of ends of sections of conductor wire or optical fiber, to connectors, said process including the steps of:
    providing a conveyor having clamps which grasp and hold said ends;
    intermittently transferring said clamps with said ends along a given transfer path;
    selectively feeding some of said clamps with said ends to end processing units arranged laterally along said transfer path;
    selectively modifying said ends on said some of said clamps using said end processing units;
    feeding said clamps with said ends to an interchange unit which is placed laterally along said transfer path;
    modifying the order of some of said ends on said conveyor through the use of said interchange unit;
    feeding said clamps with said ends to at least one connection unit placed laterally along said transfer path downstream from said interchange unit;
    said connection unit comprising means for taking each of said ends and connecting it to each of said connectors;
    said connection unit selectively connecting said each of said ends to said each of said connectors in a predetermined manner;
    said ends being connected in an order which may be different from the order in which said ends are fed to said connection unit.

2. The process according to claim 1, further including steps of,
    feeding empty clamps to said interchange unit;
    said interchange unit moving said ends from said clamps with said ends to said empty clamps.

3. The process according to claim 1, wherein, said clamps are of different types.

4. The process according to claim 1, wherein, some of said clamps grasp and hold several wires in a given order and in a limited space.

5. The process according to claim 1, wherein, said clamps can be separated from said conveyor and can be engaged mechanically thereon or withdrawn mechanically therefrom.

6. The process according to claim 4, wherein, said clamps which grasp and hold several wires in a given order and in a limited space are introduced on the conveyor at a level of said interchange unit.

7. The process according to claim 6, wherein clamps which grasp and hold several wires in a given order and a limited space are unloaded from said conveyor.

8. The process according to claim 6, wherein said interchange unit transfer some of said ends to clamps which grasp and hold several wires in a given order and in a limited space.

9. The process according to claim 1, further comprising, a control device which controls the operation of said interchange unit to rearrange said ends in a preferential order for said connection unit.

10. The process according to the claim 1, wherein the connection unit is used to take some of said ends on said conveyor, and said ends are arranged in a predetermined manner in said each of said connectors, and are taken in the same order as said ends are fed to said connection unit.

11. The process according to claim 1, wherein said connection unit and said conveyor are associated with means to withdraw at least one of said clamps from said conveyor and feed it to the connection unit.

12. The process according to claim 11, wherein said clamp is recycled without placing it back on said conveyor.

13. The process according to claim 1, wherein interconnection of several said connectors with conductor wire or optical fiber sections, includes use of several connection units arranged laterally along said transfer path.

14. The process according to claim 13, further comprising an overall control device which controls the operation of said several connection units so that said conveyor feeds an end to one of said several connection units in response to a first signal emitted by said overall control device and said one of said several connection units takes said end and connects it to one of said several said connectors in response to a second signal emitted by said overall control device, so that ends which do not correspond to said said one of said several said connection units skip said one of said several connection units.

* * * * *